(12) United States Patent
Artioli (10) Patent No.: US 6,481,422 B2
(45) Date of Patent: Nov. 19, 2002

(54) DEVICE FOR INJECTING A FUEL INTO A COMBUSTION CHAMBER OF AN INTERNAL COMBUSTION ENGINE

(75) Inventor: Romano Artioli, Luxembourg (DE)

(73) Assignee: Art & S, Automotive Technology & Style Holdings S.A., Luxembourg (LU)

( * ) Notice: Subject to any disclaimer, the term of this patent is extended or adjusted under 35 U.S.C. 154(b) by 0 days.

(21) Appl. No.: 09/914,812

(22) PCT Filed: Dec. 20, 2000

(86) PCT No.: PCT/EP00/13284
§ 371 (c)(1),
(2), (4) Date: Oct. 18, 2001

(87) PCT Pub. No.: WO01/50013
PCT Pub. Date: Jul. 12, 2001

(65) Prior Publication Data
US 2002/0134347 A1 Sep. 26, 2002

(30) Foreign Application Priority Data
Dec. 20, 1999 (LU) ................................................ 90498

(51) Int. Cl.⁷ .............................................. F02M 23/00
(52) U.S. Cl. ....................................... 123/531; 123/533
(58) Field of Search ................................. 123/297, 531, 123/533, 69, 532, 535

(56) References Cited

U.S. PATENT DOCUMENTS

| | | | | |
|---|---|---|---|---|
| 4,896,247 A | * | 1/1990 | Cozer | 165/156 |
| 5,172,865 A | * | 12/1992 | Takano et al. | 123/531 |
| 6,260,546 B1 | * | 7/2001 | Vaughn | 123/297 |

* cited by examiner

Primary Examiner—Bibhu Mohanty
(74) Attorney, Agent, or Firm—Schmeiser, Olsen & Watts (57) ABSTRACT

The invention relates to a device for controlling the injection of a fuel into a combustion chamber (2) of a cylinder of a controlled-ignition or diesel internal combustion engine, the combustion chamber (2) being equipped with at least one spark plug (8).

According to the invention, the device comprises:

an adapter support (9) intended to be mounted on the cylinder head (3) of the engine, the adapter support being arranged to delimit, on the one hand, at least partially, an injection circuit (7) for the fuel and, on the other hand, a central passage (11) for mounting the spark plug (8), and at least one control injector ($I_1$) for the fuel and one controlled injector ($I_2$) for a rinsing gas, the controlled injectors being mounted outside the combustion chamber, so that their outlets ($s_1$, $s_2$) are connected to the inlet of the injection circuit (7).

21 Claims, 5 Drawing Sheets

DEVICE FOR INJECTING A FUEL INTO A COMBUSTION CHAMBER OF AN INTERNAL COMBUSTION ENGINE

FIELD OF THE INVENTION

The present invention relates to the technical field of internal combustion engines and is aimed more particularly at systems for the direct injection of a fuel into a combustion chamber of a cylinder of a control-ignition or diesel internal combustion engine.

In the conventional way, a system for the direct injection of fuel comprises a controlled fuel injector capable of conveying the fuel directly into the combustion chamber of a cylinder, via an injector of greater or lesser complexity able to withstand the flame front and able directly to withstand combustion. Now, it has become advantageous to use natural gas in direct injection systems by way of a replacement fuel.

The benefit of the use of natural gas in controlled-ignition engines is well known from the viewpoint of overall emissions of pollutants and carbon monoxide. Even partial combustion of natural gas does not lead to the production, in significant quantities, of toxic chemical compounds or of sooty particles. Moreover, natural gas has a very high octane number making it possible for natural gas to be used in all naturally-aspirated or supercharged controlled-ignition engines without any modification. The use of natural gas thus makes it possible to significantly increase the compression ratio or the boost ratio for protection against pinging or against pre-ignition which is far greater than with gasoline or even with other liquefied gases.

It thus seems advantageous to replace the gasoline or liquefied gas supply to the engine with a system for the direct injection of natural gas without reducing the reliability of the engine and at the same time enjoying the ensuing increase in the compression ratio to improve the efficiency and power of the engine.

Many systems for the direct injection of a natural gas intended to be mounted on a combustion engine exist in the state of the art. However, the known technical solutions entail making significant modifications to the cylinder head of the engine delimiting the combustion chamber. In addition, such injection systems generally have a relatively complex design exhibiting a high cost.

SUMMARY OF THE INVENTION

One object of the invention is therefore to propose a device for the direct injection of a fuel other than the one initially intended while at the same time being designed to be mounted in place of a spark plug or of the injector in a diesel engine, so as not to entail substantial modifications to the engine.

In order to achieve such an objective, the device according to the invention comprises:

an adapter support intended to be mounted on the cylinder head of the engine, the adapter support being arranged to delimit, on the one hand, at least partially, an injection circuit for the fuel and, on the other hand, a central passage for mounting the spark plug, and at least one controlled injector for the fuel and one controlled injector for a rinsing gas, the controlled injectors being mounted outside the combustion chamber, so that their outlets are connected to the inlet of the injection circuit.

The device according to the invention also makes it possible to inject a fuel directly into a combustion chamber of a cylinder of a controlled-ignition or diesel internal combustion engine using conventional injectors customarily used for indirect injection.

One object of the invention is also to propose a technique allowing complete injection of the fuel into the combustion chamber of a cylinder of a combustion engine.

To achieve such an objective, the device according to the invention comprises control means making it possible, for each compression stroke, and after the air intake port has closed, to drive:

the fuel injector so as to inject fuel into the combustion chamber and through the injection circuit so as to leave a determined length of time between the end of injection of the fuel and the point of ignition, the injector of the rinsing gas so as to inject a rinsing gas through the injection circuit at least during the period of time so as to drive the fuel along and convey it into the combustion chamber with a view to it burning in said chamber.

The direct injection device according to the invention is designed to, on the one hand, ensure complete combustion of the fuel inside the combustion chamber and, on the other hand, inject a fuel other than the one initially intended while at the same time not entailing major modifications to such an engine.

BRIEF DESCRIPTION OF THE DRAWINGS

Various other features will become apparent from the description given hereinbelow with reference to the appended drawings which, by way of nonlimiting example, show some embodiments and implementations of the subject of the invention.

DETAILED DESCRIPTION OF THE INVENTION

Figure 1:
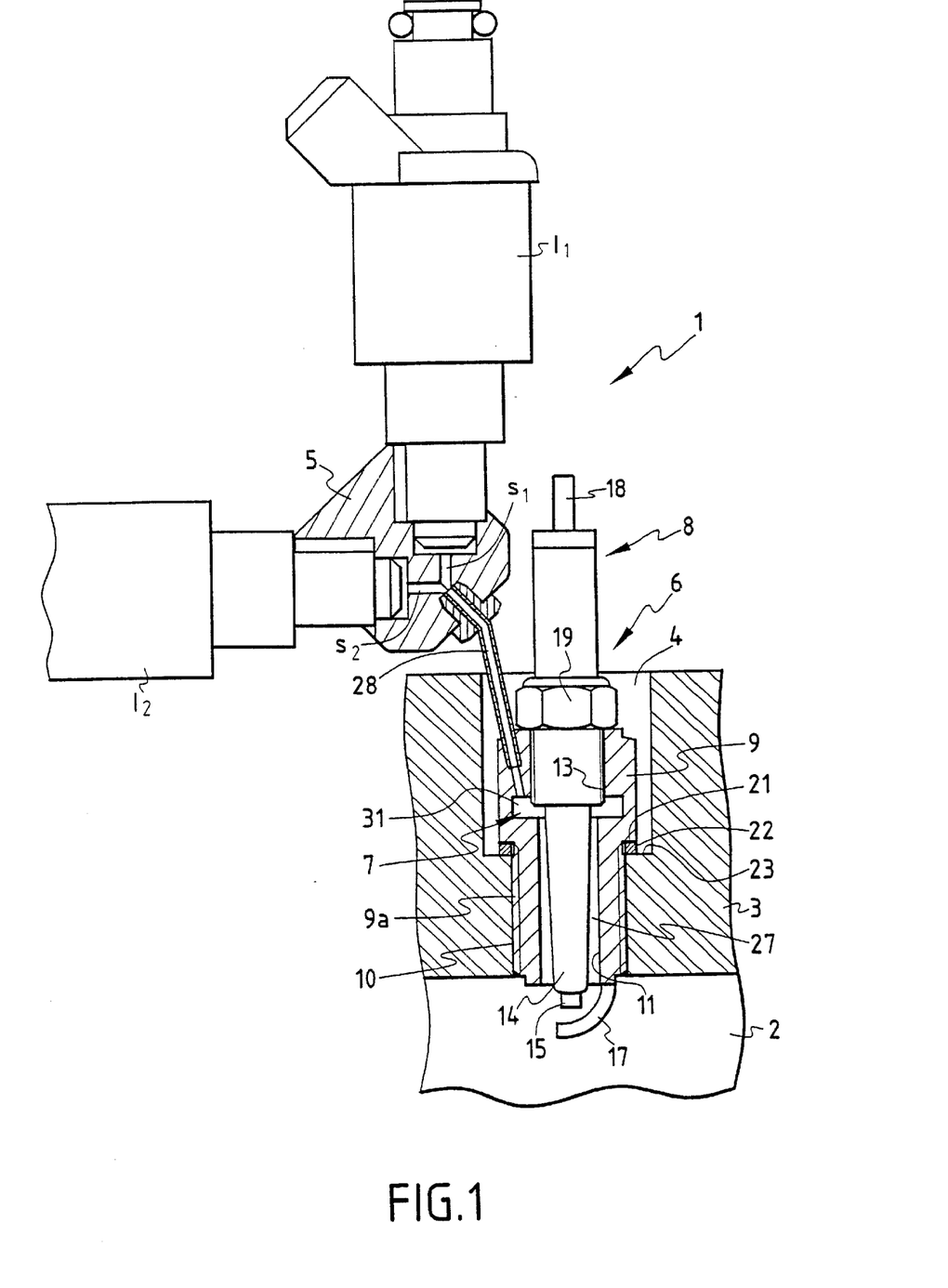
FIG. 1 is a schematic view in section/elevation of a first embodiment of an injection device according to the invention.

FIG. 1 illustrates an exemplary embodiment of a device 1 for the direct injection of a fuel into a combustion chamber 2 assigned to a cylinder, not depicted, of a controlled-ignition or diesel internal combustion engine. The combustion chamber 2, which is depicted only in part because it does not form part of the subject of the invention, is equipped in the conventional way with at least one air intake port. In the case of a four-stroke engine, this air intake port constitutes an intake valve associated with an exhaust valve, not depicted. The combustion chamber 2 is closed in the conventional way by a cylinder head 3. In the conventional way, the cylinder head 3 has, for each cylinder, an access well 4 communicating with the combustion chamber 2.

According to the invention, the device 1 comprises at least one controlled injector 1, for a fuel and one controlled injector $I_2$ for a rinsing gas. In the preferred exemplary embodiment described below, the fuel used is natural gas while the rinsing gas is air or possibly exhaust gases. As a preference, the injectors $I_1$, $I_2$ are electromagnetic injectors conventionally marketed and used in indirect injection. The controlled injectors $I_1$, and $I_2$ are mounted outside the combustion chamber 2 on an injector holder 5. The device 1 comprising an injector—spark plug holder unit 6 provided with an injection circuit 7 designed to convey at least the fuel into the combustion chamber 2. The injector circuit 7 communicates, on one side, with the outlets $s_1$, $s_2$ of the injectors $I_1$, $I_2$ and, on the other side, with the combustion chamber 2. The injector—spark plug holder unit 6 also comprises a spark plug 8.

According to one advantageous embodiment feature, the injector-spark plug holder unit 6 is designed to be mounted on the cylinder head 3 of the engine without making substantial modifications to the latter. Thus, the injector-spark plug holder unit 6 has an adapter support 9 intended to be mounted on the cylinder head 3 inside the well 4. According to an advantageous exemplary embodiment, the adapter support 9 has a tubular overall shape and externally and, for example at its lower end, has a threaded mounting part 9a intended to cooperate with a complementary tapped thread 10 made in the well 4 of the cylinder head. According to a preferred embodiment, the threaded part 9a cooperates with the tapped thread 10 corresponding to the tapping for screwing in a conventional spark plug. It is to be understood that the adapter support 9 is mounted in place of a conventional spark plug. In the case of the injection system 1 according to the invention being mounted on an engine of the diesel type, the adapter support 9 is mounted in place of the injector. In the latter exemplary embodiment, it must not be precluded for the well 4 that takes such an injector to be arranged to take the adapter support 9 according to the invention.

Figure 2:
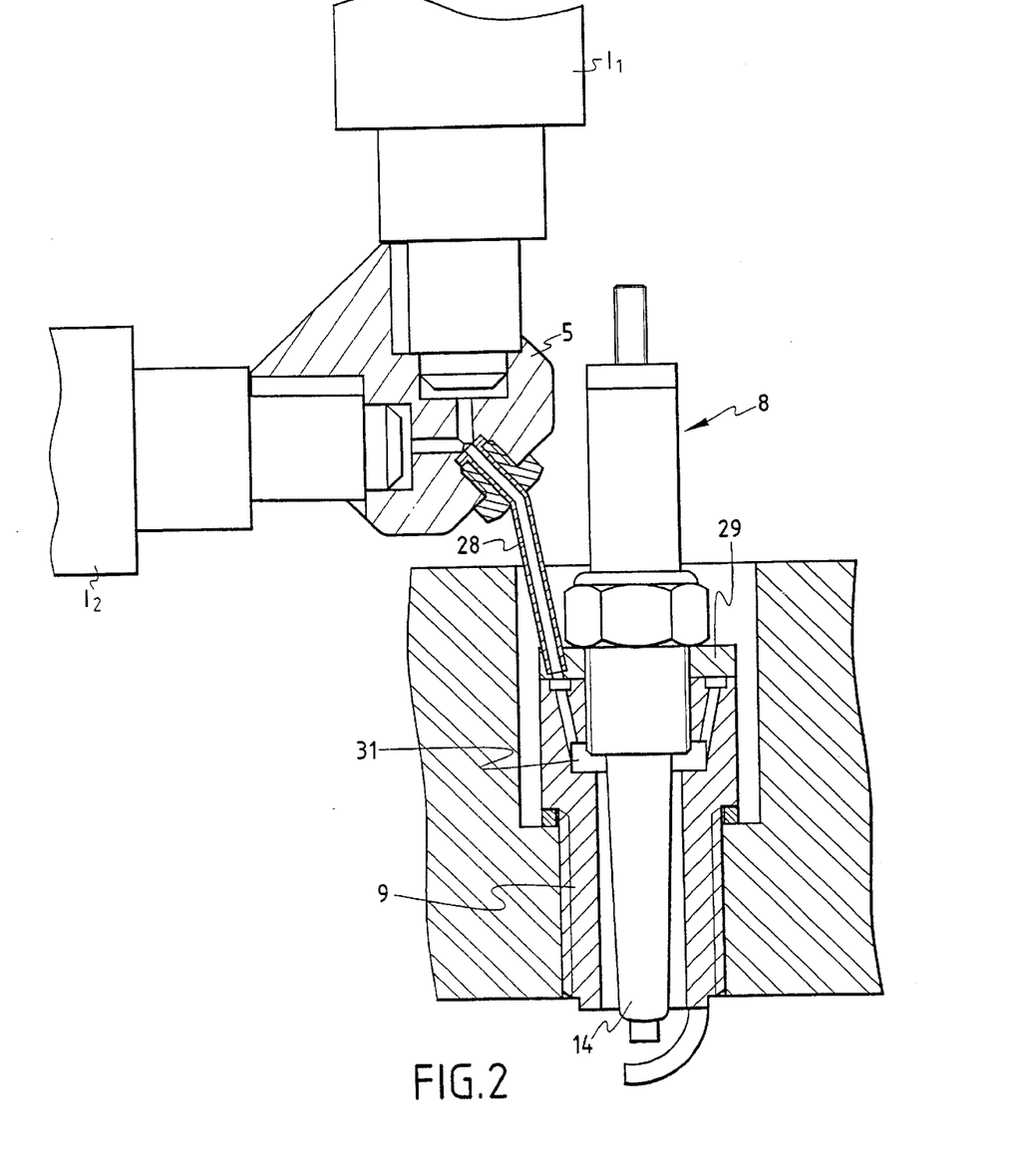
FIGS. 2 and 3 are views illustrating other alternative forms of embodiment of a control device according to the invention.

The adapter support 9 has a central passage 11 passing right through said support and allowing the spark plug 8 to be mounted. According to a preferred feature of the embodiment illustrated more particularly in FIGS. 1 to 3, the central passage 11 comprises, for example at its upper end, a tapped thread 13 intended to cooperate with a screwthread made on the spark plug 8. The spark plug 8 has, by comparison with a conventional spark plug, smaller diametral dimensions so as to allow it to be mounted inside the adapter support 9 which, in a preferred exemplary embodiment, takes the place of a conventional spark plug. The spark plug 8 thus has an electrically insulating barrel 14 from the end of which the central electrode 15 which extends into the combustion chamber 2 protrudes. According to a preferred but nonlimiting embodiment, the adapter support 9 is designed to delimit a ground electrode 17 extending conventionally close to the central electrode 15. Such a spark plug 8 comprises, in the conventional way, at the opposite end of the insulating barrel 14, an electrical-connecting nipple 18 and a tightening nut 19 allowing the spark plug 8 to be mounted on the adapter support 9.

The adapter support 9 externally comprises a shoulder 21 surmounting the threaded part 9a, so as to bear, via a sealing gasket 22, against the bottom 23 of a counterbore made in the mounting well 4. Screwing the adapter support 9 onto the cylinder head 3 thus makes it possible to mount the spark plug 8 and to seal the combustion chamber 2.

The adapter support 9 is arranged to delimit, at least partially, the injection circuit 7 for the fuel. In the exemplary embodiment illustrated in FIG. 1, the injection circuit 7 comprises an internal circuit 27 arranged in the adapter support 9 and communicating, on one side, with the combustion chamber 2 and, on the other side, with a line 28 extending externally from the adapter support 9. This line 28, which is mounted in any appropriate way on the injector holder 5 and the adapter support 9, communicates with the outlets $s_1$, $s_2$ of the injectors $I_1$, $I_2$. This line 28, consisting of a high-pressure tube, forms, with the internal circuit 27, the injection circuit 7 for the fuel. It is to be noted that in an exemplary embodiment illustrated more particularly in FIG. 2, the line 28 is mounted on a sealing plug 29 inserted between the adapter support 9 and the tightening nut 19 of the spark plug 8. Thus, mounting the spark plug 8 on the adapter support 9 makes it possible to provide sealing between the line 28 and the internal circuit 27 formed in the adapter support 9.

In the exemplary embodiment illustrated in FIG. 1, the internal circuit 27 formed in the adapter support 9 consists of an annular chamber delimited by the central passage 11 and the insulting barrel 14 of the spark plug 8. This annular chamber 27 which opens into the combustion chamber 2 around the spark plug 8 communicates with an annular counterbore 31 produced inside the adapter support 9 to constitute a distribution chamber connected to the line 28.

Figures 3, 4:
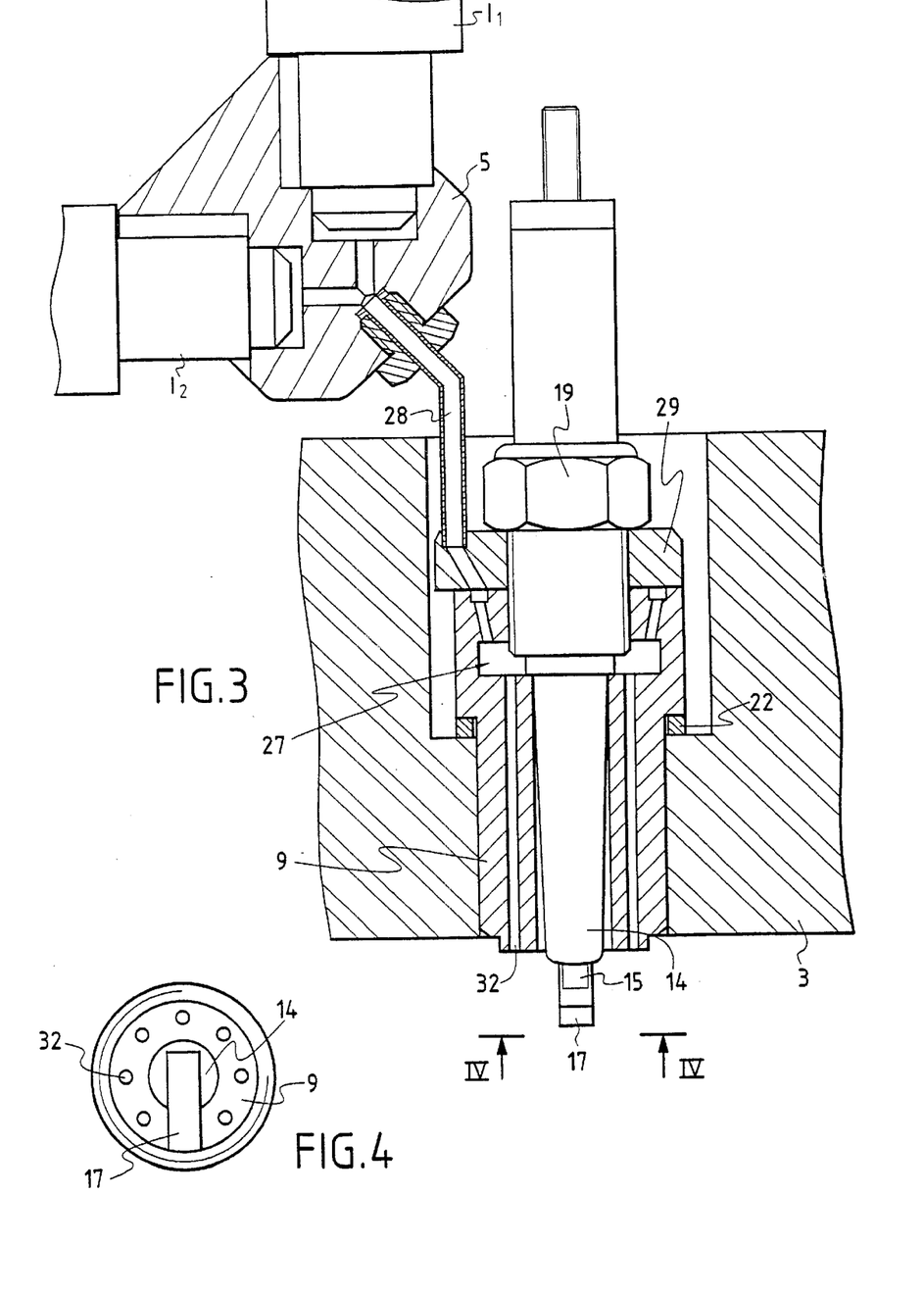
FIG. 4 is a view from underneath taken more or less along the lines IV—IV of FIG. 3.

In the example illustrated more particularly in FIGS. 3 and 4, the internal circuit 27 of the injection circuit 7 consists of a series of ducts 32 formed in the adapter support 9 on the same radius and parallel to one another. These ducts 32 communicate, on one side, with the combustion chamber 2 and, on the other side, with the annular counterbore 31 connected to the line 28. The ducts 32 thus open onto the transverse face of the adapter support 9 extending inside the combustion chamber and are distributed around the central electrode of the spark plug 8 allowing good dispersion of the fuel with the air contained in the combustion chamber 2.

Figure 5:
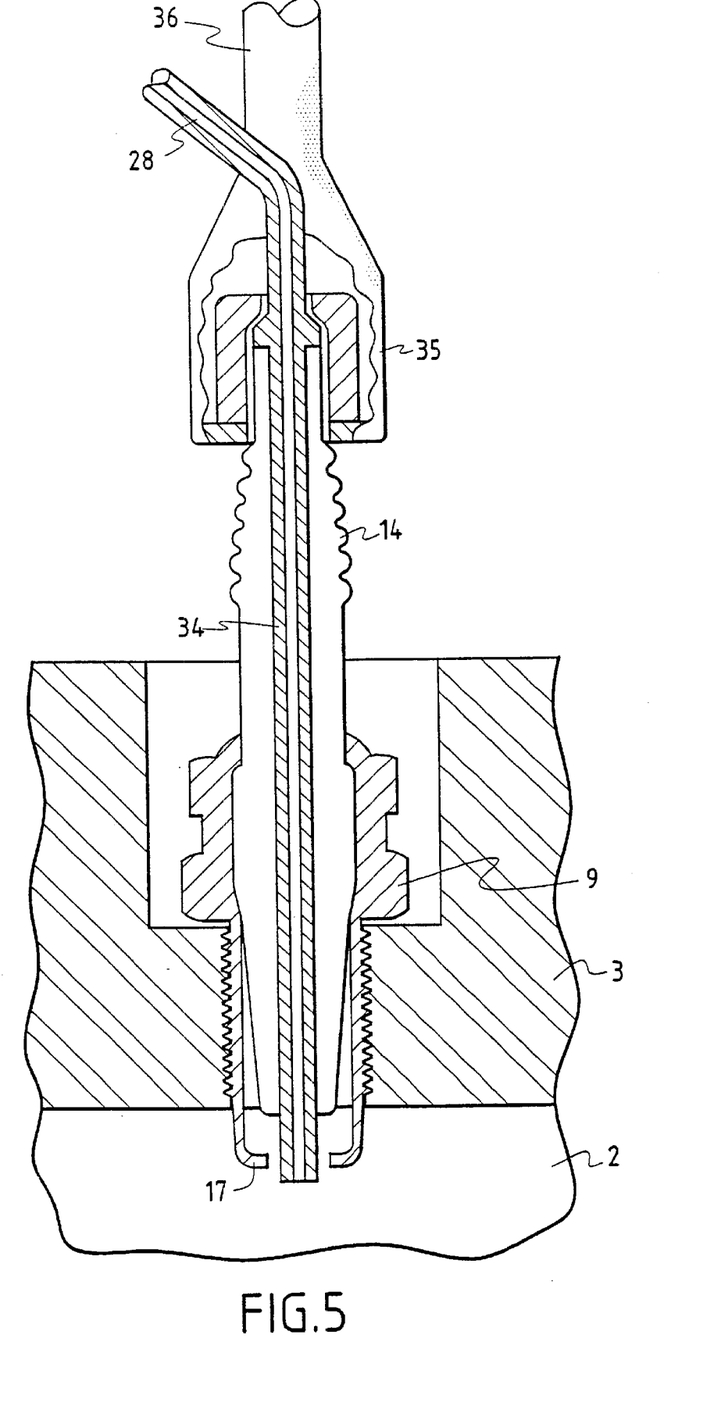
FIGS. 5 and 6 are schematic views showing other exemplary embodiments of the injection device according to the invention.

FIG. 5 schematically illustrates another exemplary embodiment of the internal circuit 27 of the injection circuit. In this example, the internal circuit 27 consists of a tubular pipe 34 opening, on one side, into the combustion chamber 2 and communicating, on the other side, with the line 28 connected to the outlets of the injectors $I_1$, $I_2$. This tubular pipe 34 is connected to an electrical supply by any appropriate means so as to constitute the central electrode 15 of the spark plug 8. For example, this tubular electrode or pipe 34 is surrounded by the electrically insulating barrel 14, of which the part extending away from the combustion chamber 2, serves to mount a connecting endpiece 35 of an electric supply cable 36 which provides the electrical connection with the tubular pipe 34. Of course, the line 28 is made of an electrically insulating material. The electrically insulating barrel 14 is mounted inside the adapter support 9 which delimits the ground electrode 17.

According to another feature of the invention, the device 1 according to the invention also comprises control means, which have not been depicted but which are known per se, making it possible to drive the operation of the injectors $I_1$, and $I_2$ with a view to implementing a method for controlling the injection of fuel according to the invention.

These control means make it possible, for each compression stroke, and after an air intake port of the cylinder has closed, to drive:

the fuel injector $I_1$, so as to inject fuel into the combustion chamber 2 and through the injection circuit 7 so as to leave a determined length of time between the end of injection of the fuel and the point of ignition, the injector $I_2$ of the rinsing gas so as to inject a rinsing gas through the injection circuit 7 at least during the period of time so as to drive the fuel along and convey it into the combustion chamber 2 with a view to it burning in said chamber.

Thus, for each compression stroke, once the intake port of the associated cylinder has closed, the fuel injector $I_1$ is controlled so as to inject the fuel, for a determined injection time which conventionally is dependent upon the desired load and the customary various combustion management parameters. Such injection of fuel is ended a few tens of degrees before the point of ignition so as to leave a determined period of time between the end of the injection of fuel and the point of ignition, during which period of time the injector $I_2$ of rinsing gas delivers a sufficient amount of rinsing gas to drive the fuel along and convey it into the combustion chamber 2 with a view to it being burnt upon ignition. This then gives a kind of rinsing of the injection circuit 7 making it possible to eliminate any trace of fuel and, in particular, of methane contained in the circuit and which would be late to arrive in the chamber for burning if the production of a jet of rinsing gas had not occurred.

Figure 6:
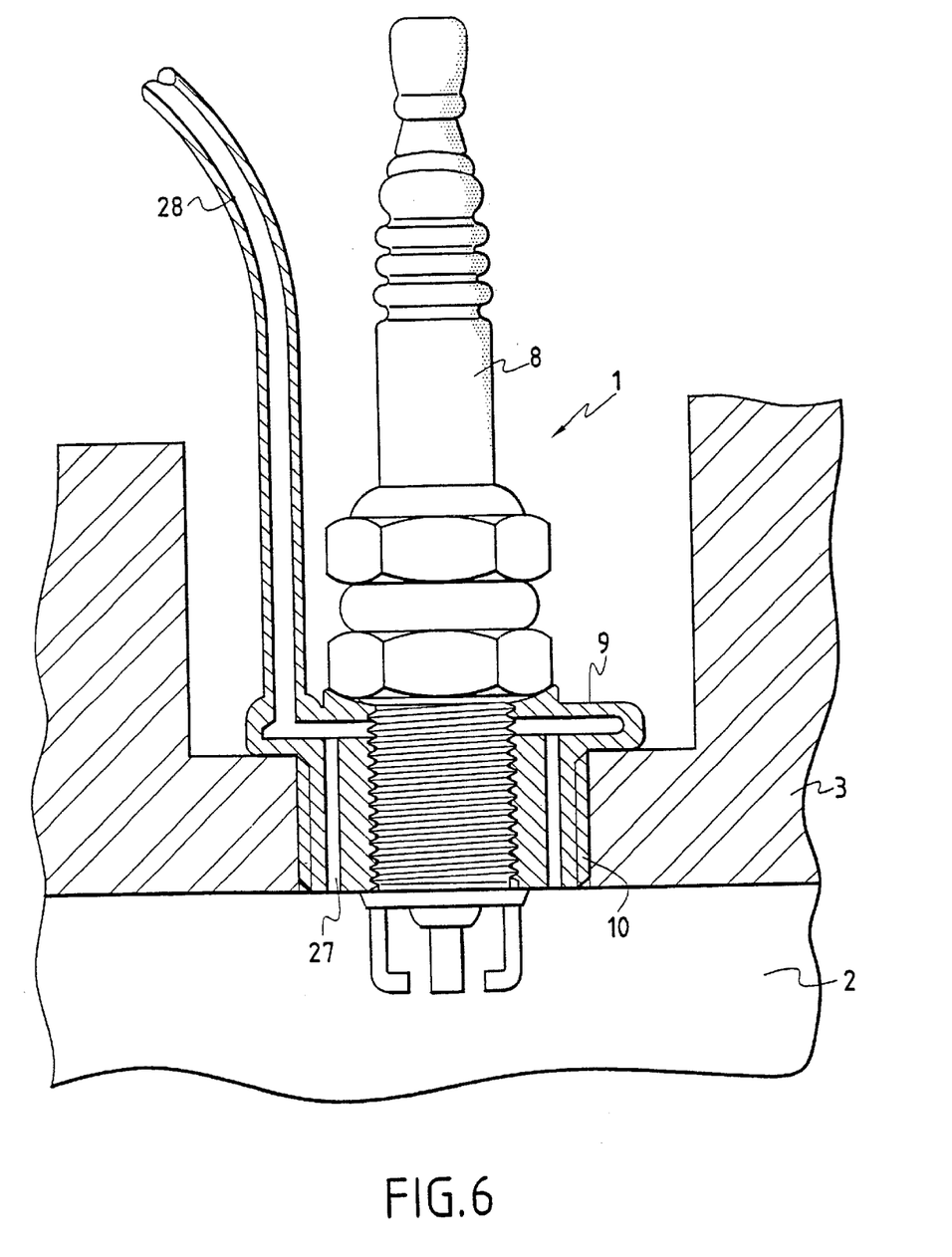

According to the foregoing description, the subject of the invention makes it possible to ensure complete combustion of the fuel delivered by the injector by sending, prior to ignition, a jet of rinsing gas into the injection circuit. Furthermore, the injection device 1 according to the invention is designed to be mounted, without modifications to the cylinder head, in place of the spark plug on a gasoline engine or on a diesel engine in place of the injector, while at the same time ensuring complete combustion of the fuel injected, likely to be found in the injection circuit. In addition, such an injection device 1 implements conventional injectors and a spark plug which is special-purpose but of a design similar to the known one. In this respect, it may be advantageous to use a 10 mm spark plug used in competitive motoring as compared with special-purpose production of the spark plug. Thus, as is more particularly apparent from FIG. 6, fitting the injection device 1 according to the invention is relatively simple in that all that is required is the production of an adapter support 9 designed to cooperate with the tapped thread 10 conventionally made in the cylinder head 3. Such an adapter support 9 supports the spark plug 8 and has an internal circuit 27 connected to the line 28.

The injection device 1 makes it possible relatively easily to change the type of fuel used by an engine, for example, to natural gas. However, to increase the multi-functionality of such a system, provision may be made for an additional injector designed, for example, to deliver gasoline or liquefied petroleum gas, to be mounted on the injector holder 5. In this alternative form, the injection of the rinsing gas, such as air, is also performed during the injection of the fuel so as to perform pre-mixing prior to introduction into the combustion chamber 2. Of course, the injection of the rinsing gas is continued after the end of injection of the fuel so as to drive said fuel from the injection circuit, as explained above. According to this exemplary embodiment, the internal injection circuit 27 is as per the one described in FIGS. 3 and 4 employing concentric ducts 32, so that the carburetted mixture does not find itself in contact with the insulating barrel 14 of the spark plug.

The invention is not restricted to the examples described and depicted, because various modifications can be made thereto without departing from its scope.

What is claimed is:

1. A device for controlling the injection of a fuel into a combustion chamber (2) of a cylinder of a controlled-ignition or diesel internal combustion engine, the combustion chamber (2) being equipped with at least one spark plug (8), characterized in that it comprises:

an adapter support (9) intended to be mounted on the cylinder head (3) of the engine, the adapter support being arranged to delimit, on the one hand, at least partially, an injection circuit (7) for the fuel and, on the other hand, a central passage (11) for mounting the spark plug (8), and at least one controlled injector ($I_1$) for the fuel and one controlled injector ($I_2$) for a rinsing gas, the controlled injectors being mounted outside the combustion chamber, so that their outlets ($s_1$, $s_2$) are connected to the inlet of the injection circuit (7).

2. The device as claimed in claim 1, characterized in that the adapter support (9) comprises a threaded mounting part (9a) intended to cooperate with a tapped thread (10) formed in the cylinder head (3) and corresponding to the tapped thread for screwing in a conventional spark plug or to a tapped thread formed in the passage for mounting a diesel injector.

3. The device as claimed in claim 2, characterized in that the adapter support (9) comprises a threaded part (9a) surmounted by a shoulder (21) intended to bear, via a sealing gasket (22), against the bottom (23) of a mounting well formed in the cylinder head.

4. The device as claimed in claim 1, characterized in that the adapter support (9) comprises a central passage (11) which is partially tapped (13) to allow the spark plug (8) to be mounted by screwing.

5. The device as claimed in claim 1, characterized in that the adapter support (9) comprises, in its part opening into the combustion chamber, the ground electrode (17) of the spark plug (8).

6. The device as claimed in claim 1, characterized in that the injection circuit (7) comprises an internal circuit (27) formed in the adapter support (9) and communicating, on one side, with the combustion chamber (2) and, on the other side, with a line (28) connected to the injector outlets ($s_1$, $s_2$).

7. The device as claimed in claim 6, characterized in that the internal circuit (27) of the injection circuit (7) consists of an annular chamber delimited between the central passage (11) and the spark plug (8) and communicating with the line (28).

8. The device as claimed in claim 6, characterized in that the internal circuit (27) of the injection circuit (7) consists of a series of ducts (32) formed in the adapter support (9) and communicating, on one side, with the combustion chamber (2) and, on the other side, with a distribution chamber (31) communicating with the line (28).

9. The device as claimed in claim 6, characterized in that the internal circuit (27) of the injection circuit (7) consists of a tubular pipe opening into the combustion chamber (2) and communicating with the line (28) connected to the injector outlets, said tubular pipe being electrically connected in order to constitute the central electrode of the spark plug (8).

10. The device as claimed in claim 6, characterized in that the line has one end mounted on an injector holder and communicating with the injector outlets ($s_1$, $s_2$) and an opposite end mounted on a sealing plug inserted between the adapter support and the spark plug.

11. The device as claimed in claim 10, characterized in that the injector holder (5) is equipped with a controlled injector ($I_1$) for the fuel of the natural gas type and/or with a controlled injector for gasoline or liquefied petroleum gas.

12. The device as claimed in claim 1, characterized in that it comprises control means making it possible, for each compression stroke, and after an air intake port has closed, to drive:

the fuel injector so as to inject fuel into the combustion chamber and through the injection circuit so as to leave a determined length of time between the end of injection of the fuel and the point of ignition, the injector of the rinsing gas so as to inject a rinsing gas through the injection circuit at least during the period of time so as to drive the fuel along and convey it into the combustion chamber with a view to it burning in said chamber.

13. The device as claimed in claim 12, characterized in that the control means make it possible to control the injection of the rinsing gas during injection of the fuel so as to perform pre-mixing prior to introduction into the combustion chamber (2).

14. The device as claimed in claim 12, characterized in that the fuel injector ($I_1$) injects natural gas by way of fuel.

15. The device as claimed in claim 12, characterized in that the fuel injector ($I_1$) injects gasoline or liquefied petroleum gas by way of fuel.

16. The device as claimed in claim 12, characterized in that the injector of a rinsing gas injects air or exhaust gases by way of rinsing gas.

17. A cylinder head for a combustion engine, characterized in that it is equipped with a control device as claimed in one of claims 1 to 16.

18. The device as claimed in claim 7, characterized in that the line has one end mounted on an injector holder and communicating with the injector outlets ($s_1$, $s_2$) and an opposite end mounted on a sealing plug inserted between the adapter support and the spark plug.

19. The device as claimed in claim 8, characterized in that the line has one end mounted on an injector holder and communicating with the injector outlets ($s_1$, $s_2$) and an opposite end mounted on a sealing plug inserted between the adapter support and the spark plug.

20. The device as claimed in claim 9, characterized in that the line has one end mounted on an injector holder and communicating with the injector outlets ($s_1$, $s_2$) and an opposite end mounted on a sealing plug inserted between the adapter support and the spark plug.

21. The device as claimed in claim 1, characterized in that it comprises control means making it possible, for each compression stroke, and after an air intake port has closed, to drive:

the fuel injector so as to inject fuel into the combustion chamber and through the injection circuit so as to leave a determined length of time between the end of injection of the fuel and the point of ignition, the injector of the rinsing gas so as to inject a rinsing gas through the injection circuit at least during the period of time so as to drive the fuel along and convey it into the combustion chamber with a view to it burning in said chamber.

* * * * *

UNITED STATES PATENT AND TRADEMARK OFFICE
CERTIFICATE OF CORRECTION

PATENT NO.         : 6,481,422 B2
APPLICATION NO. : 09/914812
DATED                  : November 19, 2002
INVENTOR(S)        : Artioli It is certified that error appears in the above-identified patent and that said Letters Patent is hereby corrected as shown below:

Inventor: Romano Artioli, Luxembourg, delete --(DE)-- and insert (LU)

Signed and Sealed this

Eleventh Day of July, 2006

JON W. DUDAS
*Director of the United States Patent and Trademark Office*